United States Patent [19]

Baker

[11] Patent Number: 5,533,109
[45] Date of Patent: Jul. 2, 1996

[54] TELECOMMUNICATION SYSTEM WITH USER MODIFIABLE PBX TERMINATING CALL FEATURE CONTROLLER AND METHOD

[75] Inventor: Daniel F. Baker, Rolling Meadows, Ill.

[73] Assignee: Rockwell International Corporation, Seal Beach, Calif.

[21] Appl. No.: 316,701

[22] Filed: Sep. 30, 1994

[51] Int. Cl.$^6$ .................................................. H04M 3/00
[52] U.S. Cl. ........................... 379/201; 379/265; 379/225; 379/231; 379/269; 379/112
[58] Field of Search ................................ 379/201, 207, 379/196, 142, 268, 221, 225, 265, 266, 94, 112, 231, 269

[56] References Cited

U.S. PATENT DOCUMENTS

| | | | |
|---|---|---|---|
| 4,988,209 | 1/1991 | Davidson et al. | 379/94 |
| 5,023,868 | 6/1991 | Davidson et al. | 379/94 |
| 5,031,211 | 7/1991 | Nagai et al. | 379/207 |
| 5,062,103 | 10/1991 | Davidson et al. | 379/94 |
| 5,144,653 | 9/1992 | Masuoka | 379/266 |
| 5,153,909 | 10/1992 | Beckle et al. | 379/265 |
| 5,181,236 | 1/1993 | Lavallee et al. | 379/266 |
| 5,181,239 | 1/1993 | Jolissaint | 379/266 |
| 5,185,782 | 2/1993 | Srinivasan | 379/266 |
| 5,299,260 | 3/1994 | Shaio | 379/265 |
| 5,309,505 | 5/1994 | Szlam et al. | 379/266 |
| 5,309,513 | 5/1994 | Rose | 379/266 |
| 5,353,343 | 10/1994 | Hymel | 379/201 |
| 5,365,581 | 11/1994 | Baker et al. | 379/201 |
| 5,384,841 | 1/1995 | Adams et al. | 379/266 |

*Primary Examiner*—Jeffery Hofsass
*Assistant Examiner*—Scott Wolinsky
*Attorney, Agent, or Firm*—C. B. Patti; G. A. Montayne

[57] ABSTRACT

A telecommunication system (11) having a private branch exchange (PBX) (10) with a multiport switch (12) controlled by a central control processing unit (14) and an associated PBX memory (16) for directing telephonic calls to terminate at identified ones of a plurality of PBX internal telephonic units (22) placed at predetermined positions of the multiport switch (12), a user modifiable PBX terminating call feature controller (30) which stores a call handling feature script in memory (16) defining call handling operations for telephonic calls directed to an identified PBX internal telephonic unit (22) and a system administration unit (24) coupled with the central control processing unit (14) of the PBX (10) for modifying the call handling feature script through employment of commands entered at the system administration unit (24) at the PBX (10) to alter the call handling operations of telephonic calls terminating at the identified PBX internal telephonic unit (22).

18 Claims, 9 Drawing Sheets

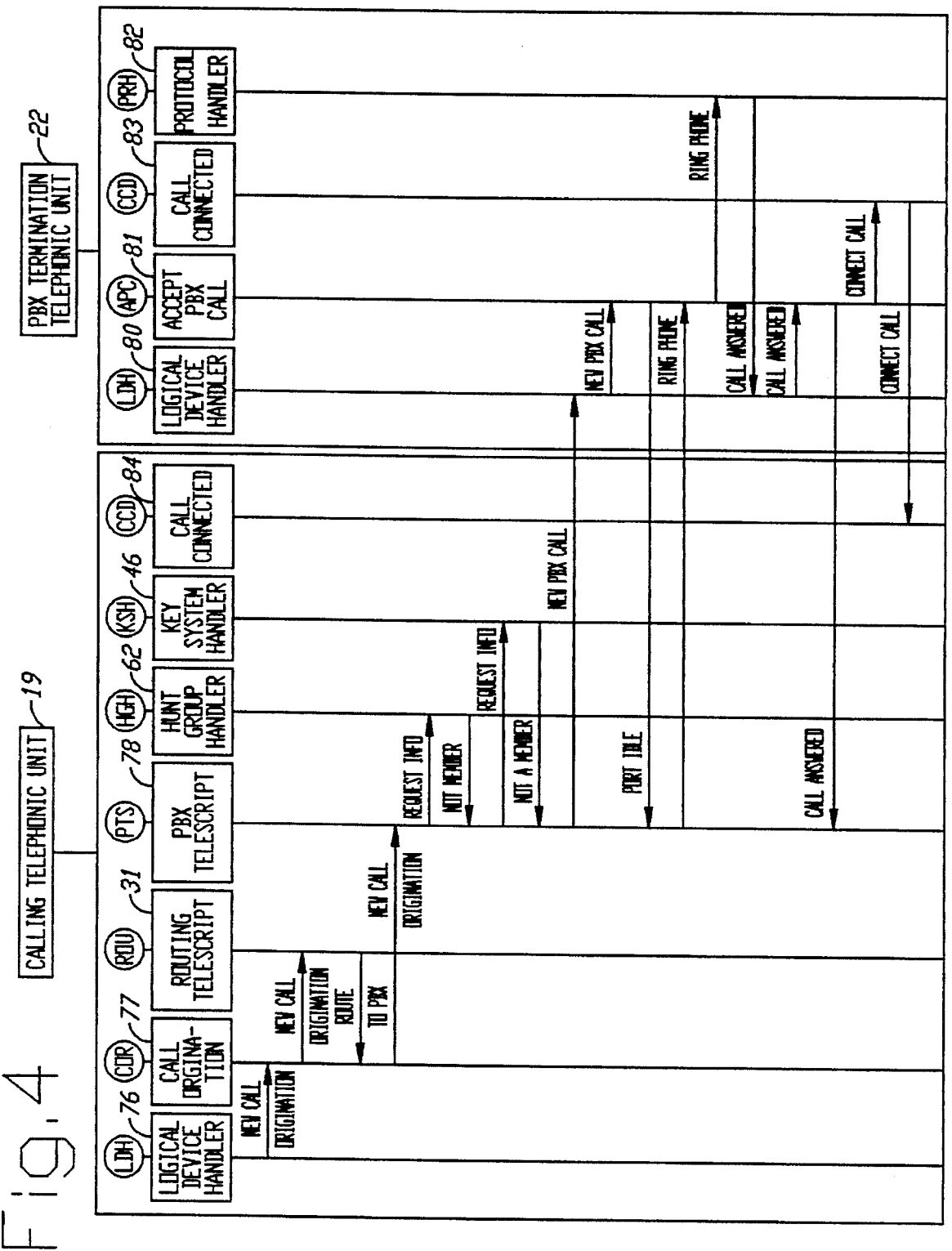

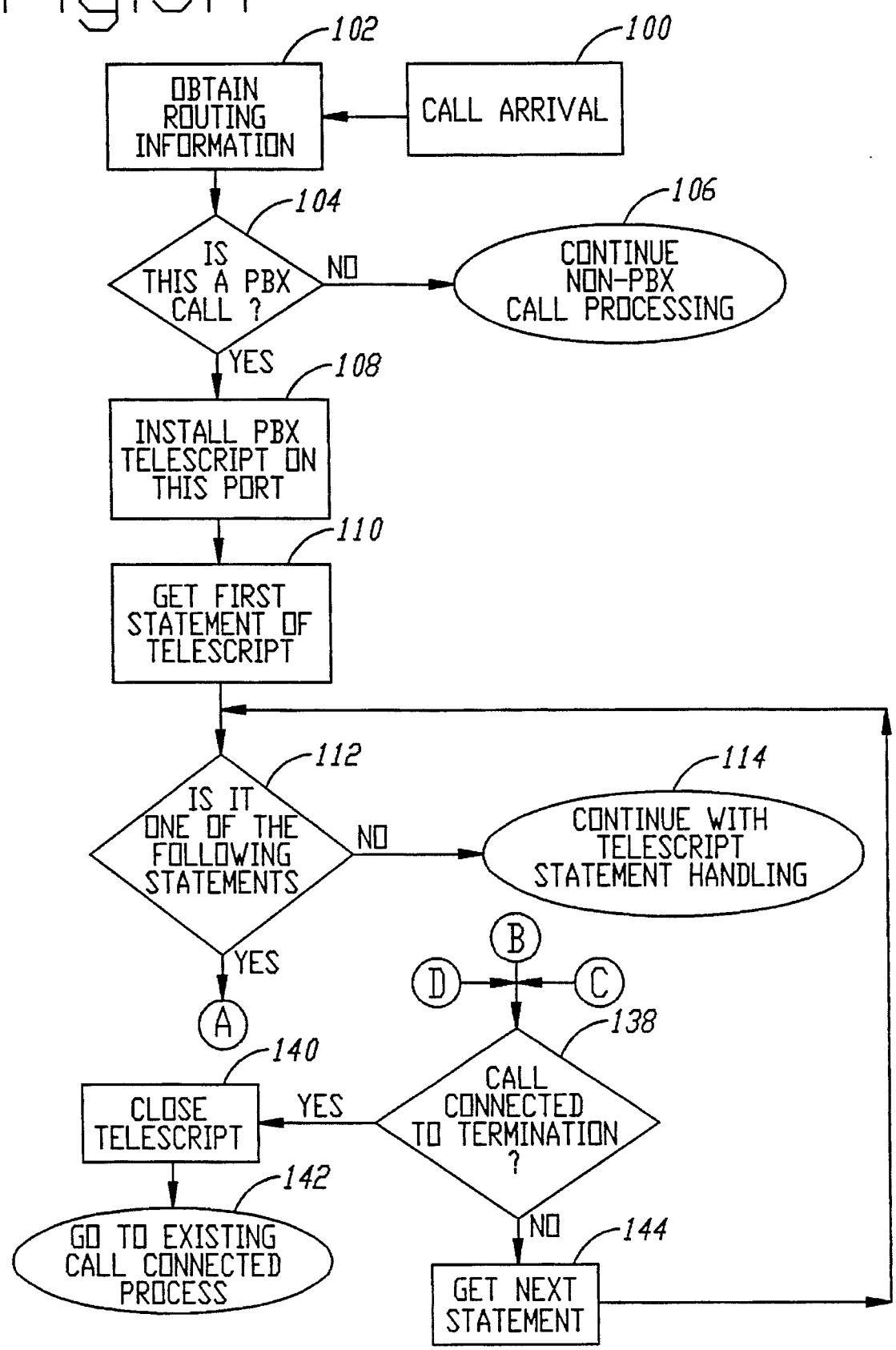

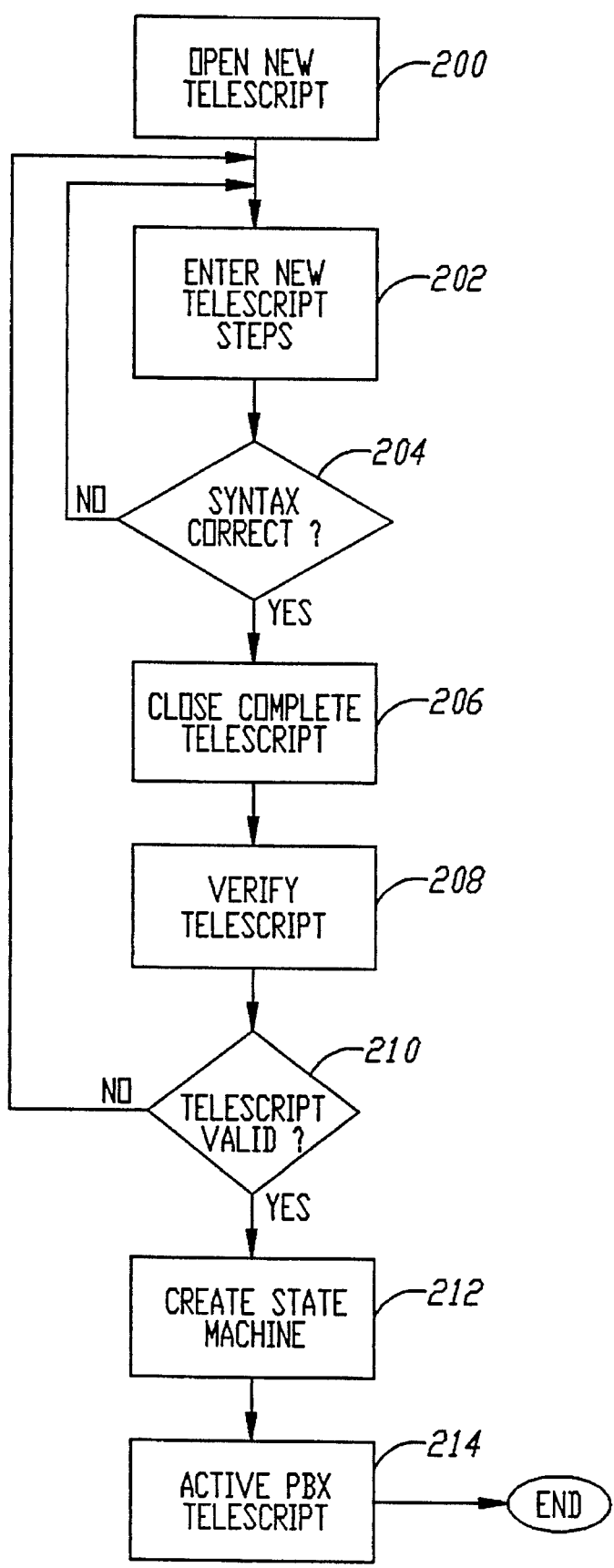

TELECOMMUNICATION SYSTEM WITH USER MODIFIABLE PBX TERMINATING CALL FEATURE CONTROLLER AND METHOD

BACKGROUND OF THE INVENTION

1. Field of the Invention

This invention relates generally to the field of private branch exchange telecommunication systems and, more particularly, to a private branch exchange system having various call servicing features for calls terminating at private branch exchange telephonic units of the system.

2. Description of the Prior Art

Telecommunication systems having a private branch exchange (PBX) controlled by a central control processing unit in conjunction with a main memory for connecting telephonic calls received from external telephonic units of an external switching network with private branch exchange telephonic units at predetermined positions of the PBX are well known. Examples of such systems are shown in U.S. Pat. No. 5,268,903 of Jones et al. entitled "Multichannel Telephonic Switching Network With Different Signaling Formats and Cross Connect/PBX Treatment Selectable For Each Channel", issued Dec. 7, 1993; U.S. Pat. No. 5,140,611 of Jones et al. entitled "Pulse Width Modulated Self-Clocking and Self-Synchronizing Data Transmission and Method for a Telephonic Communication Network Switching System", issued Aug. 18, 1992; U.S. Pat. No. 5,127,004 of Lenihan et al. entitled "Tone and Announcement Message Code Generator for a Telephonic Switching System and Method" issued Jun. 30, 1992 and U.S. Pat. No. 4,627,047 of Pitroda et al. entitled "Integrated Voice and Data Telecommunication Switching System", issued Dec. 2, 1986.

In PBX systems, telephonic calls are switched to a particular line identified by the dialed call and connected to a PBX telephonic unit associated with the telephone line. Unlike, in automatic call distributor systems in which calls are routed to various groups or pools of agents for servicing, PBX systems are programmed to route a received call directly to the PBX position or PBX telephonic unit identified by the call dialed from the calling party. A call terminating at a PBX position telephonic unit that is busy or is set not to accept calls, is handled by one or more different call servicing features (e.g. call forwarding, subsequent call back, forward to voice mail, etc.) of the PBX system. The feature types and the order of the procedural steps for handling a PBX call directed at an associated PBX position telephonic unit are based on programmed and stored 'C' code in known PBX systems. The order in which the terminating features for a call associated with a particular PBX position are checked by the system against any feature specific decisions about call handling residing in the compiled and stored software code.

The compiled code checks the current state of a call along with provisionable feature parameters to implement decisions on call handling. Therefore, PBX systems operate according to the fixed internal software feature ordering. Disadvantageously, the stored and compiled code is not readily alterable without the necessity of employing a skilled programmer who must accurately reprogram the system to the desired change in feature ordering without interfering with the internal operation of the system.

In certain automatic call distribution systems various call handling features or applications associated with particular agent groups are alterable by the user without reprogramming the compiled code internally stored at the call distributor. This type of alterable call feature handling in an automatic call distributor is seen in U.S. patent application Ser. No. 07/975,240 of Sumner et al. entitled "Control Device For The Network Of A Telephone Switching System" filed Nov. 12, 1992. Unfortunately, the user alterable call feature handling for automatic call distributors is not seen in PBX systems. Moreover, the operation of a PBX system significantly differs from that of an automatic call distributor. Automatic call distributions are very structured for the specific purpose of routing calls to agent groups for servicing a high volume of calls in a short time. Agent consoles in automatic call distributors are generally limited to application features relating to optimizing the agent handling of a call by minimizing the discrete actions required to answer and process a call. In automatic call distribution systems, calls are routed to agent groups with the corresponding agents having very little or no control in the method of routing or of answering received calls. A PBX position telephonic unit, conversely, is a general purpose device having call handling features which enable the called party to either answer a call or send the call to alternate destinations (e.g. voice mail). However, in known PBX systems, a fixed order of operation is set in the compiled code for calls associated with a PBX position. The user or system administrator has no control over the execution of PBX calls since the PBX system operates only according to its internal software feature ordering. Once a particular order of feature operation is determined, in known systems, the set operation is fixed in compiled code software modules internal to the system. Disadvantageously, an operational change in the features for PBX positions, in a known system, requires the extremely time consuming and highly skilled task of reprogramming the internally stored compiled feature application software code. Therefore, even the slightest modification to feature operations are time consuming, inefficient and costly to the user due to the inflexibility of known PBX systems.

SUMMARY OF THE INVENTION

It is therefore a principal object of the present invention to provide a telecommunication system having a private branch exchange (PBX) with a user modifiable PBX terminating call feature controller and method in which the disadvantages of known PBX systems noted above are overcome by providing means and methods for selectively altering the call handling operations of telephonic calls terminating at PBX internal telephonic units.

The object is achieved by providing a telecommunication system having a private branch exchange (PBX) with a multiport switch controlled by a central control processing unit and an associated PBX main memory for directing telephonic calls to terminate at identified ones of a plurality of PBX internal telephonic units placed at predetermined positions of the multiport switch, with a user modifiable terminating call feature controller having means for storing a call handling feature script defining call handling operations for telephonic calls directed to an identified PBX internal telephonic unit and means for modifying the call handling feature script through the employment of commands entered at the PBX to alter the call handling operations of telephonic calls terminating at the identified PBX internal telephonic unit.

The object is achieved by performing a method for modifying PBX terminating call features in a telecommunication system having a private branch exchange (PBX) with a multiport switch controlled by a central control processing unit and an associated PBX main memory for directing telephonic calls to terminate at identified ones of a plurality of PBX internal telephonic units placed at predetermined positions of the multiport switch comprising the steps of (a) storing a call handling feature script defining call handling operations for telephonic calls terminating at an identified PBX internal telephonic unit and (b) modifying the call handling feature script through the employment of commands entered while the PBX is on-line to alter the call handling operations of telephonic calls terminating at the identified PBX internal telephonic unit.

BRIEF DESCRIPTION OF THE DRAWING

The foregoing objects and advantageous features of the invention will be explained in greater detail and others will be made apparent from the detailed description of the preferred embodiment of the present invention which is given with reference to the several figures of the drawing, in which:

FIG. 4 is a preferred bounce diagram for a call terminating at a PBX internal telephonic unit of FIG. 1 of the present invention;

FIGS. 5A–5D form a composite flow chart illustrating the preferred procedural processing flow for telescript statements of the present invention; and FIG. 6 is a flow chart for the preferred procedural steps for modifying a telescript of the present invention.

DESCRIPTION OF THE PREFERRED EMBODIMENT

Figure 1:
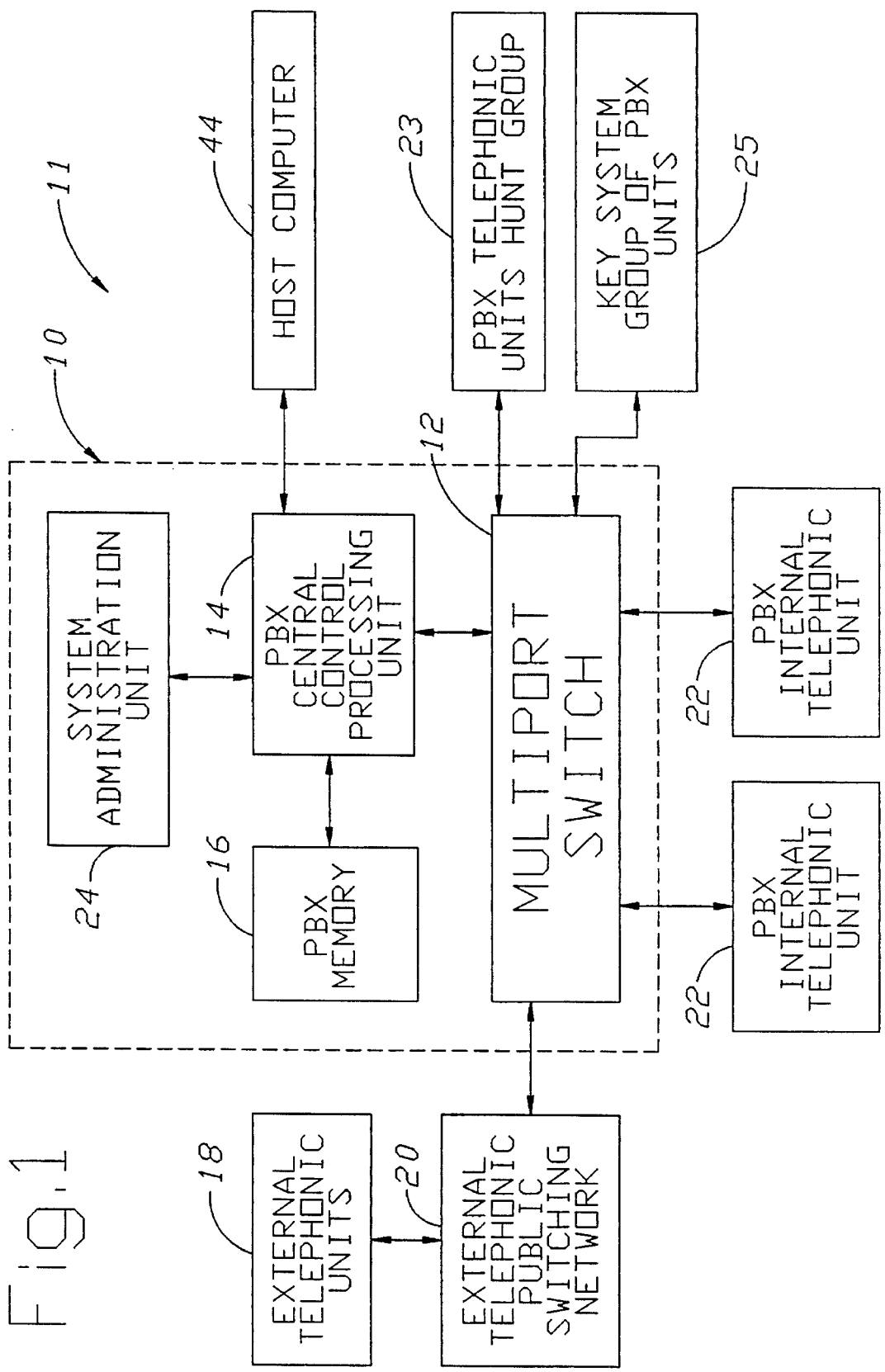
FIG. 1 is a functional block diagram of the preferred embodiment of the telecommunication system with the private branch exchange (PBX) of the present invention as interconnected with a known external telephonic network.

Referring to FIG. 1, a private branch exchange (PBX) 10 is shown having a multiport switch 12 controlled by a PBX central processing unit 14 in conjunction with an associated PBX main memory 16 for directly connecting telephonic calls made from external telephonic units 18 via an external telephonic switching network 20 to correspondingly identified PBX internal telephonic units 22. The telephone number dialed at an external telephonic unit 18 identifies a particular individual telephonic line of a PBX internal telephonic unit 22 coupled with the PBX 10. The PBX 10 directly routes an identified telephonic call received at the multiport switch 12 to the associated PBX telephonic unit 22.

A system administrator stationed at a system administration unit 24 coupled with the PBX central control processing unit 14 enters various high level commands at the administration unit to modify procedural order of execution and the types of call servicing features implemented at the PBX internal telephonic units 22. The system administration unit 24 is preferably either a terminal or personal computer which interfaces with the PBX central processing unit 14 to alter and modify the various telescripts stored in the PBX main memory 16.

A telescript is a set or series of call handling coded statements which are associated with PBX telephonic units 22. A defined telescript determines the type, order and priority of call servicing features for a particular terminating position or PBX telephonic unit 22. For example, if a PBX call is routed to a corresponding PBX position telephonic unit 22 and the unit is busy or set not to receive a call the defined PBX telescript associated with the PBX unit determines how the call is serviced within the system (i.e. call routed to voice mail, music played to external unit, route to alternate PBX position etc.). The call servicing features are readily modified by the user or system administrator through implementation of various telescript commands at the system administration unit 24. Any modification to the ordered high level statements comprising a new telescript are verified by the PBX central control processing unit 14 to ensure the modifications comply with the internal call servicing parameters of the PBX 10 of the telecommunication system 11.

A call handling feature script, called a telescript, is associated with each port of the multiport switch 12 which is identified as being connected to a PBX internal telephonic unit 22. The call handling feature scripts define the call handling operations for dialed telephonic calls identified to terminate at PBX internal telephonic units 22. The call handling feature script or telescript is an ordered set of call handling statements with each statement defining a particular call servicing or switching operation. The relatively high level ordered statements are composed of relatively low level coded instructions which run on the PBX central control processing unit 14 to execute the call handling operations for calls terminating at PBX internal units 22 of the switch 12. The call handling feature script consisting of the relatively high level ordered call handling statements is readily modifiable at the location of the PBX 10 and is alterable while the PBX is in an on-line operation.

The system administrator enters various commands at the system administration unit 24 to initiate modification of the call handling operations of telephonic calls terminating at PBX internal telephonic units 22. The system administrator creates a new or modified telescript at the system administration unit 24 for execution by the PBX central control processing unit 14 by selectively changing the procedural order of the call handling statements. Alternatively, the system administrator inserts additional particular call handling statements to the ordered set of statements to modify the telescript. The call handling feature script or telescript is altered by further selectively deleting certain call handling statements from the ordered set of statements of the defined telescript existing for a particular PBX internal telephonic unit 22. The modifications to the various telescripts are easily performed by the system administrator by simply altering the high level call handling statements at a command level as opposed to the necessity of reprogramming and recompiling the low level code at the instruction level as seen known PBX systems. The call handling feature scripts associated with the PBX internal telephonic units 22 are readily defined and altered by the system administrator or user of the system in a simple manner at the location of the PBX while the PBX is on-line to custom control the call handling features performed at each PBX telephonic unit.

Once the system administrator has changed the order or arrangement of the call handling statements by entering telescript commands at the system administration unit 24, the PBX central control processing unit 14 verifies that the changed order of call handling statements comply with the internal system parameters of the PBX 10. The central processing unit 14 creates a state machine derived from the changed ordered set of call handling statements if the central control processing unit verifies that the new or modified telescript compiles with the system parameter.

The system administrator stationed at the system administration unit 24 by altering the call handling statements of the telescript, in turn, selects the order of telephonic features for PBX calls directed to a PBX internal telephonic unit 22. The ordering the statements selectively relate to features which serve a plurality of PBX internal telephonic units 22 or groups of PBX units such as a key system group of units 25 or a hunt group of PBX units 23.

The ordered set of features for a defined telescript selectively modified by the system administrator include but are not limited to directing incoming calls to a voice mail group, directing calls to alternate PBX internal telephonic units if the dialed PBX unit is busy or programmed not to receive calls, directing a PBX unit to automatically call back a previous caller when the unit becomes idle, call forwarding of telephonic calls, and determining whether a PBX telephonic unit is busy or idle. The call handling features are identified through employment of the call handling feature statements and executed by the central control unit 14 stored in the main memory 16 of the PBX 10.

The selectively alterable telescripts associated with a PBX unit 22 also identify whether the PBX unit is a member of a preselected PBX hunt group 23 or a key system group 25. An intercept group is identifiable by the telescript for a particular PBX unit 22. Telephonic calls which cannot be completed or entirely processed are redirected to an intercept group or an alternative destination PBX unit for special processing. Control of the visual and audible indications to individuals stationed at PBX internal telephonic units 22 in response to received calls therein is defined in the telescript for the PBX units. An external remote host computer 44 alternatively is coupled to the central control processing unit 14 of the PBX 10. The host computer 44 selectively controls particular call handling functions for predetermined PBX internal telephonic units 22. A defined telescript directs the central control processing unit 14 to notify the host computer 44 of telephonic call flow at the predetermined PBX units 22 in order for the host computer to direct the logic at the central control unit and control the operations of the telephonic calls.

Other various features which are employed at the PBX 10 and are readily modified through the use of telescripts include but are not limited to: camp on busy, call waiting, day and night service, conference calling and distinctive ringing.

Individuals enter sign-in and sign-out codes at the respective PBX internal telephonic units 22. Preferably, the PBX internal telephonic units are standard Integrated System Digital Network (ISDN) basic rate interface (BRI) type interior telephonic units. The defined telescripts are associated with the individuals stationed at various PBX units 22. The telescripts correspond to a particular port coupled with a PBX internal telephonic unit 22 upon the sign-in of the individual at the particular PBX unit. Thus, the call handling feature scripts are preferably independent of the hardware associated with the individual PBX telephonic units 22. Staff individuals at a PBX interior telephonic units 22 place themselves in PBX termination groups upon sign-in at a PBX unit and remove themselves from the PBX termination group when signing-out at the PBX telephonic units.

The central control processing unit 14 of the PBX 10 determines if a particular call handling feature is available at the PBX internal telephonic unit 22 receiving a directed PBX call based on the read telescript defined for the individual stationed at the PBX unit. Generally while the private branch exchange can be implemented in numerous types and sizes of telecommunication systems, it is preferably implemented in a system of the types shown in U.S. Pat. No. 5,268,903 of Jones et al. entitled "Multichannel Telephonic Switching Network With Different Signaling Formats and Cross Connect/PBX Treatment Selectable For Each Channel", issued Dec. 7, 1993; U.S. Pat. No. 5,140,611 of Jones et al. entitled "Pulse Width Modulated Self-Clocking and Self-Synchronizing Data Transmission and Method for a Telephonic Communication Network Switching System", issued Aug. 18, 1992; U.S. Pat. No 5,127,004 of Lenihan et al. entitled "Tone and Announcement Message Code Generator for a Telephonic Switching System and Method", issued Jun. 30, 1992 and U.S. Pat. No 4,627,047 of Pitroda et al. entitled "Integrated Voice and Data Telecommunication Switching System", issued Dec. 2, 1986.

Figure 2:
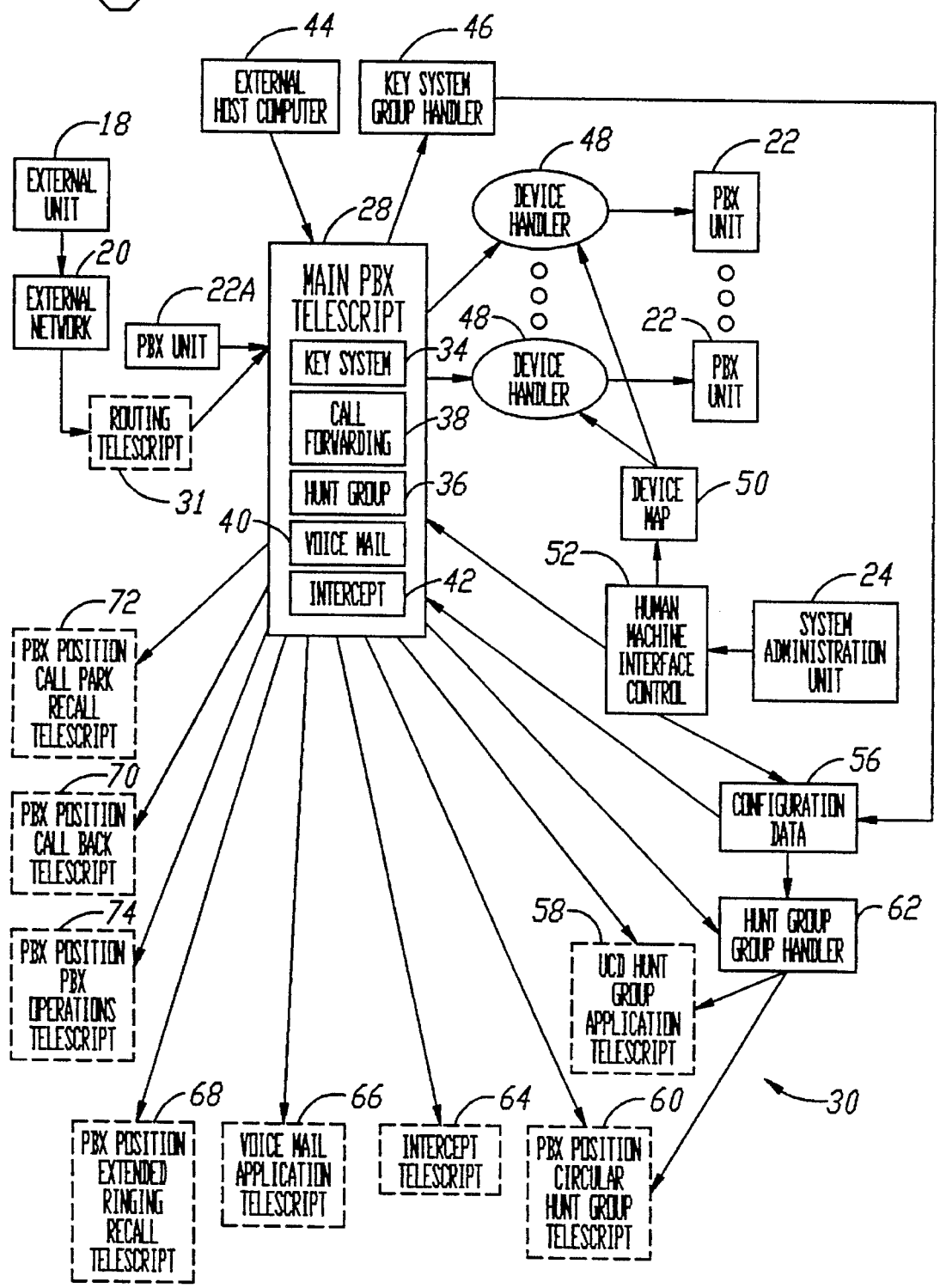
FIG. 2 is a block diagram of the preferred PBX call feature controller present invention for the PBX of FIG. 1.

Referring now to FIG. 2, a detailed control representation for the user modifiable PBX terminating call feature controller 30 is shown having a main PBX telescript 28 and a plurality of call operation specific telescripts. The control of the main PBX telescript 28 and the associated call specific telescripts 58–72 operate through the PBX central control processing unit 14 with the associated control and handling software, telescripts and data stored in the main memory 16 of FIG. 1. Telephonic calls received from the external telephonic network 20 go through a routing telescript 31. The routing telescript 31 performs a translation on the destination digits dialed from the external telephonic unit 18 and receives a route instruction to terminate at a particular identified to PBX unit 22 destination from the routing processes in memory 16.

If the call is a internal call initiated by a PBX internal unit 22A the routing telescript 30 is not employed. The logical device handler for the individual calling at the internal PBX unit 22A, performs a translation on the dialed digits and receives a route to PBX termination destination instruction from the internal routing processes for PBX 10.

The main PBX termination telescript 28 is associated with every PBX termination unit 22 in the system. The main or primary PBX telescript 28 is implemented as a state machine which has a logical instance on every port of the multiport switch 12 of FIG. 1. For an incoming call to the switch 12 the primary PBX telescript 28, FIG. 2, starts executing at the beginning of the telescript. The variables controlled by the primary PBX telescript 28 include:

a. Is the PBX termination telephonic unit 22 busy or idle.

b. Is PBX termination unit 22 a member of a key system group 34.

c. Is the PBX unit 22 for termination a member of a hunt group 36.

d. Is the call forwarding call handling feature 38 activated.

e. Is the identified PBX termination unit 22 directing calls to the voice mail call handling feature 40.

f. Should the call be directed to the intercept feature 42.

g. Is the remote external host computer 44 to determine call disposition.

The main PBX telescript 28 is not limited to the above listed call handling controlling features and selectively includes alternative features provided by the system administrator. The main PBX telescript 28 selectively, uses all the call handling statements and variables used in other telescripts. If the PBX telephonic unit 22 for termination is a member of a key system group 34 the main PBX telescript 28 queues the key system group handler 46 to provide ringing and lamp indications to PBX units 22 which are members of the group that share appearances with the identified PBX termination telephonic unit 22.

If the PBX 10 is connected to an external host computer 44 and the primary PBX telescript 28 is programmed at the system administration unit 24, the primary PBX telescript 28 informs the host computer 44 of the call arrival and waits for directions for routing the call which is received from the host computer. If the host computer 44 does not respond the telescript continues after a control operator programmable delay time.

The PBX telescript control is independent of the physical PBX termination type unit 22 because a device driver 48 handles all unique hardware dependencies for various PBX telephonic units 22 and communicate with the main PBX telescript 28 by using generic events. The device map 50 under the control of the system administration unit 24 allows unique PBX telephonic units 22 to have translated generic telephony actions such as "on hook" "off hook" "flash" "dialed digits" etc.

The system administrator at administration unit 24 communicates with the central control processor 14, FIG. 1, and is able to program the main PBX telescript 28 in memory 16 using the internal-machine interface control programming 52, FIG. 2. All PBX Termination options are programmed by the system administrator through the human machine interface control 52 including the device specific information for PBX units at the device map 50 and configuration data 56 that specifies the operation of key system software including which internal telephonic PBX termination units 22 are in a key system group 34, and which directory numbers appear on each PBX termination unit and call appearance key. The options for primary and secondary appearances and the types and cadences of ringing applied at the identified PBX termination unit are provided.

PBX termination hunt group information 36 is also under the control of the system administrator at the administration unit 24. PBX hunt groups 36 are under the control of separate hunt group telescripts 58 and 60. The main PBX telescript 28 gives control to either the hunt group application telescript 58 or the PBX position hunt group telescript 60 which are provided programmed by the system administrator. The hunt group PBX telescripts 58 and 60 queue to the appropriate hunt group 36 which is controlled by the hunt group handler 62. The main PBX telescript 28 selectively transfers control to any system intercept telescript 64 as so provided by the system administrator 24.

The main PBX telescript 28 transfers control to the voice mail telescript 66 if enabled through the system administration unit 24. This enables the system administrator to determine at what point in a call that the calling party is given the option of leaving a voice mail message for a busy or not answering PBX termination telephonic unit 22.

The main PBX telescript 28 selectively transfers control to the extended ringing recall PBX telescript 68 if provisioned by the system administrator. The extended ringing recall telescript 68 allows for all the same options to be given to a caller that has been transferred to a PBX termination telephonic unit 22 that does not answer the call.

The main PBX telescript 28 further selectively transfers control to a call back telescript 70 if enabled through the system administration unit 24. The callback feature allows the calling party at an internal telephonic unit (i.e. PBX unit 22 or other type of internal telephonic unit at the multiport switch) to leave in the PBX 10, a request that when the previously busy called party is idle to be called back. The call back telescript allows the system administrator to direct the PBX central control processor 14 to provide the call handling desired when the call back feature attempts the call back but finds the party to be called back is busy again. The preferred action is to queue the caller again, to the call back queue, so that the identified terminating PBX unit 22 is automatically called back when it becomes idle.

The main PBX telescript selectively transfers control to the call park recall telescript 72. The called park recall telescript 72 is used when a call has been left in the call park state exceeding a preselected time period and is being directed to recall the party last talked to and it finds that party is presently busy.

The main PBX telescript 28 further selectively transfers control to the PBX operations telescript 74. The operations telescript 74 is used to provide the PBX operations that handle callers that have exhausted other system call handling operations. For example the operations telescript selectively plays general auto attendant messages, transfers a caller to a general voice mail box or sends a caller to intercept. The actions taken in the operations telescript are under the control of the system administrator at the system administration unit 24.

Figure 3:
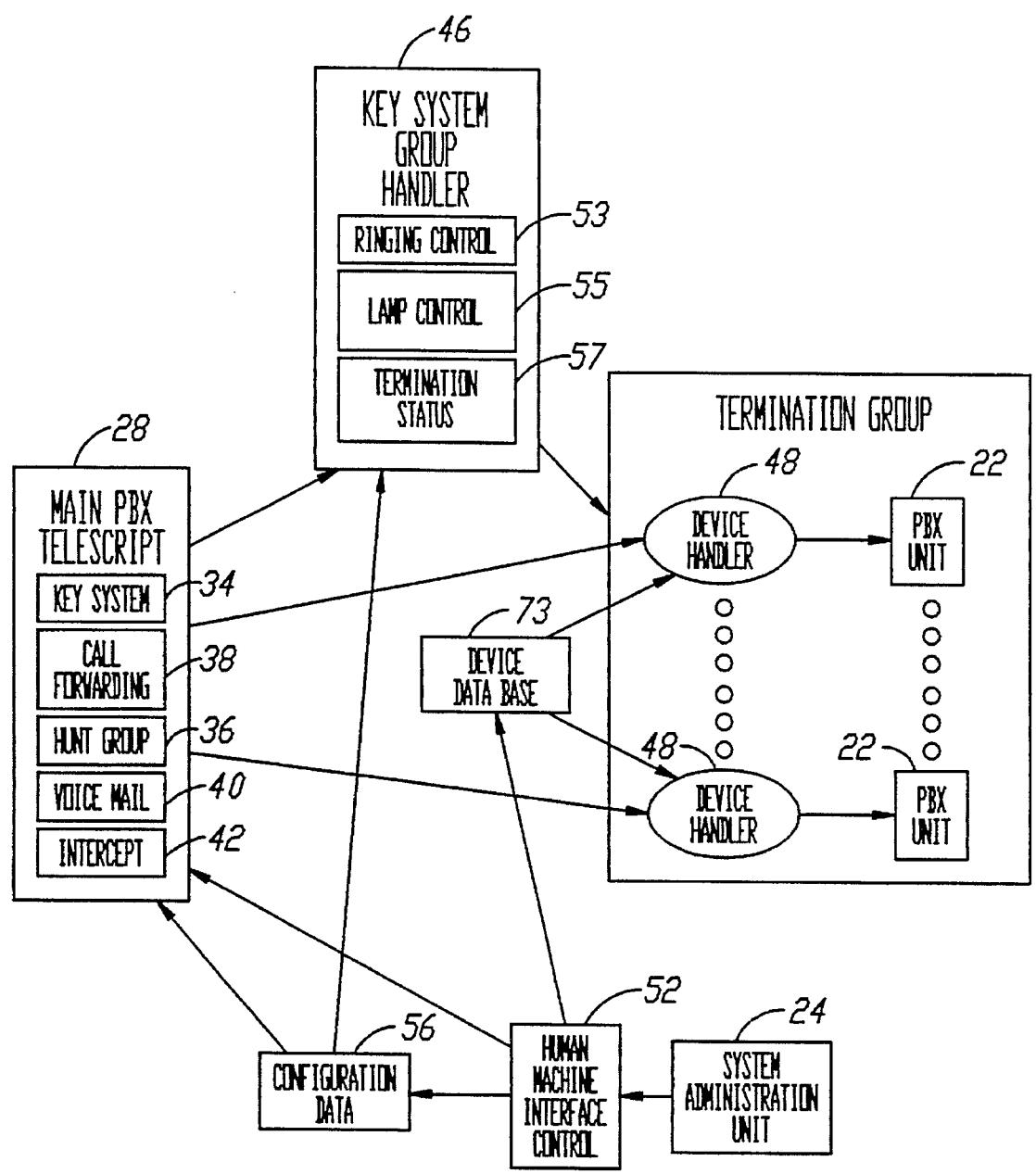
FIG. 3 is a block diagram of the key system control apparatus of the present invention.

Referring now to FIG. 3, the key system operation is shown for the user modifiable PBX terminating call feature controller 30 of FIG. 2. The system administrator at system administration unit 24 through the human-machine interface control processing 52, programs the device dependent information into the device database 73 to control the specific PBX internal telephonic units 22. The system administrator further sets the configuration data 56 for the key system operation.

The primary or main PBX telescript 28 receives the telephonic call when the PBX 10 number decode has determined the particular call is identified to terminate at a PBX internal telephonic unit 22. The main PBX telescript 28 determines that the received call is to terminate to a particular PBX unit 22 that is member of a key system group 34 and it queues the caller to the key system group handler 46. The key system group handler 46 has the ringing control 55, lamp control 55 and termination status 57 for the associated PBX internal telephonic units 22 in order to control the visual and audible indications at the PBX units of a key system group upon receipt of a call at a unit.

Each of the device handlers 48 have queued themselves to their respective key system group 34 upon activation. Each device handler 48 further notifies the group handler 46 when it is available for ringing and when it is busy. The key system group handler 46 communicates with the main PBX telescript 28 in controlling the key system group 34.

The system administrator at administration unit 24 selectively controls the terminating and ringing of the key system group 34 through the main PBX telescript 28. The main telescript 28 determines that the PBX termination unit 22 is a member of a key system group 34 and if the PBX termination unit 22 is busy. If the position is idle and a member of a key system group 34 the telescript queues to the key system group handler 46 to ring the termination and any other terminations as defined by the key system group handler 46.

FIG. 4 is a bounce diagram of the events between various parts of the telecommunication system 11 for a call directed to terminate at a position for particular PBX telephonic unit 22. The left portion of FIG. 4 illustrates the events and state machines associated with the origination of the telephonic call from a calling telephonic unit 19. The calling telephonic unit is either an external telephonic unit 18, a PBX telephonic unit initiating a call for termination, or another internal telephonic unit such as an agent unit or supervisory unit (not shown) coupled with the multiport switch. The right portion of FIG. 4 shows the state machines and events associated with the terminating side of the call at the PBX telephonic unit 22.

A new call is detected by the originating port logical device handler 76 and it sends a new call origination event to the call origination (COR) state machine 77. The call originating state machine 77 is in its idle state and goes to its dial state and prepares to receive the digits dialed at the calling telephonic unit 19. The transition to the new state and any functions needed to be performed in that transition are accomplished by processing modules executing in the PBX system memory 16, FIG. 1. A new call origination event is sent to the routing telescript state machine 31, FIG. 4, for it to analyze the received dialed digits once collected. Once the digits are received they are translated against digits stored in the system memory 16, FIG. 1, and the routing telescript state machine 31, FIG. 4, determines that the destination of the telephonic call is to an identified PBX termination telephonic unit 22. The routing telescript 31 sends a Route to PBX event to COR 77. COR 77 sends a new call origination event to the main PBX telescript state 78 machine of the calling party.

The PBX telescript state machine 78 sends a Request Information event requesting the Hunt Group Handler (HGH) 62 to determine if the called party at PBX termination unit 22 is an active hunt group member. The hunt group handler 62 responds with a not a member event. Since the called individual at PBX unit 22 is not in a hunt group the telescript 78 goes to its next statement.

Executing the next telescript statement the PBX telescript state machine 78 sends an Request Information event to the Key System Group Handler (KSH) 46 to determine the called PBX termination unit 22 is a member of a key system group. The KSH 46 responds with a Not A Member event. Since the called PBX termination unit 22 is not in a key system group the telescript goes to the next statement. From previous checks the PBX telescript state machine 78 knows that the line is a single telephonic line termination with no features active. The PBX telescript state machine 78 for the calling telephonic unit 19 sends the New PBX Call event to the logical device handler (LDH) 80 for the PBX unit 22 on the terminating side of the call to let it know that the new PBX call has arrived.

The called PBX unit LDH 80 sends a New PBX Call event to the Accept PBX Call (APC) state machine 81 which prepares the port to receive the call. The APC state machine 81 determines that the called party is idle and is available to be rung. The APC state machine 81 subsequently sends a port idle event to the PBX telescript 78 to let the PBX telescript know the APC can ring the PBX unit 22. The PBX telescript 78 sends a ring phone event to the APC 81 to initiate ringing of the PBX termination telephonic unit 22. APC 81 in turn sends a ring phone event to the hardware protocol handler 82 to actually ring the identified PBX unit 22. Upon the PBX termination unit 22 physically going off hook the telephone hardware protocol handler 82 detects the answer and sends a call answered event to the logical device handler 80 port of the PBX termination telephonic unit 22.

The called unit LDH 80 sends a call answered event to APC 81 to let it know the call has been answered. APC 81 then signals the calling party PBX telescript 78 that the call is answered. Calling party PBX telescript 78 returns to the idle state since its functions are complete. The call is completed by the called PBX unit APC 81 sending a connect call event to the called PBX unit call connected (CCD) state machine 83. The CCD state machine 83 sends the connect call event to the calling telephonic unit CCD 84 that the call is now connected. This causes the connection to be made and the calling telephonic unit 19 and the called PBX termination telephonic unit 22 have a voice connection.

Referring now to FIGS. 5A–5D, in step 100, a call arrives at the switch 12, FIG. 1, of the PBX 10. In step 102, FIG. 5A, the central control processing unit 14 of the PBX 10 determines the routing of the received call by analyzing the digits dialed of the call. In step 104, the PBX 10 translates the received digits to determine if the call is a PBX telephonic call to terminate at an identified PBX position telephonic unit 22.

If the received call is not a PBX call, then in step 106, the call is handled by the existing non-PBX call processing software stored in the memory 16 of the system 10. If it is determined that the call is for a PBX termination position telephonic unit 22, then in step 108, the particular PBX call handling feature script or telescript in the PBX memory 16 associated with the PBX position telephonic unit 22 is installed on the port of the identified unit through the employment of capability mapping. For further details on the capability mapping feature and its associated operation, reference can be made to U.S. Pat. No. 5,365,581 of Baker et al. entitled "Telephonic Switching System With Automatic Port Assignment Capability and Method" issued Nov. 15, 1994.

In step 110, the first statement of the telescript installed on the port is read by the central control processing unit 14. In step 112, the PBX 10 determines if the first statement of the received telescript is one of the following statements: IF PBX, OFFER, SELECT, QUEUE UCD-HUNT GROUP, QUEUE BRIDGE APPEARANCE, QUEUE CALL BACK, ROUTE. The PBX 10 determines if the first statement is one of these listed statements by looking at the statement operand. If the first statement of the telescript for the terminating PBX unit 22 is not one of these new statements, then in step 114, the processing continues to execute the identified telescript statement.

Figure 5B:
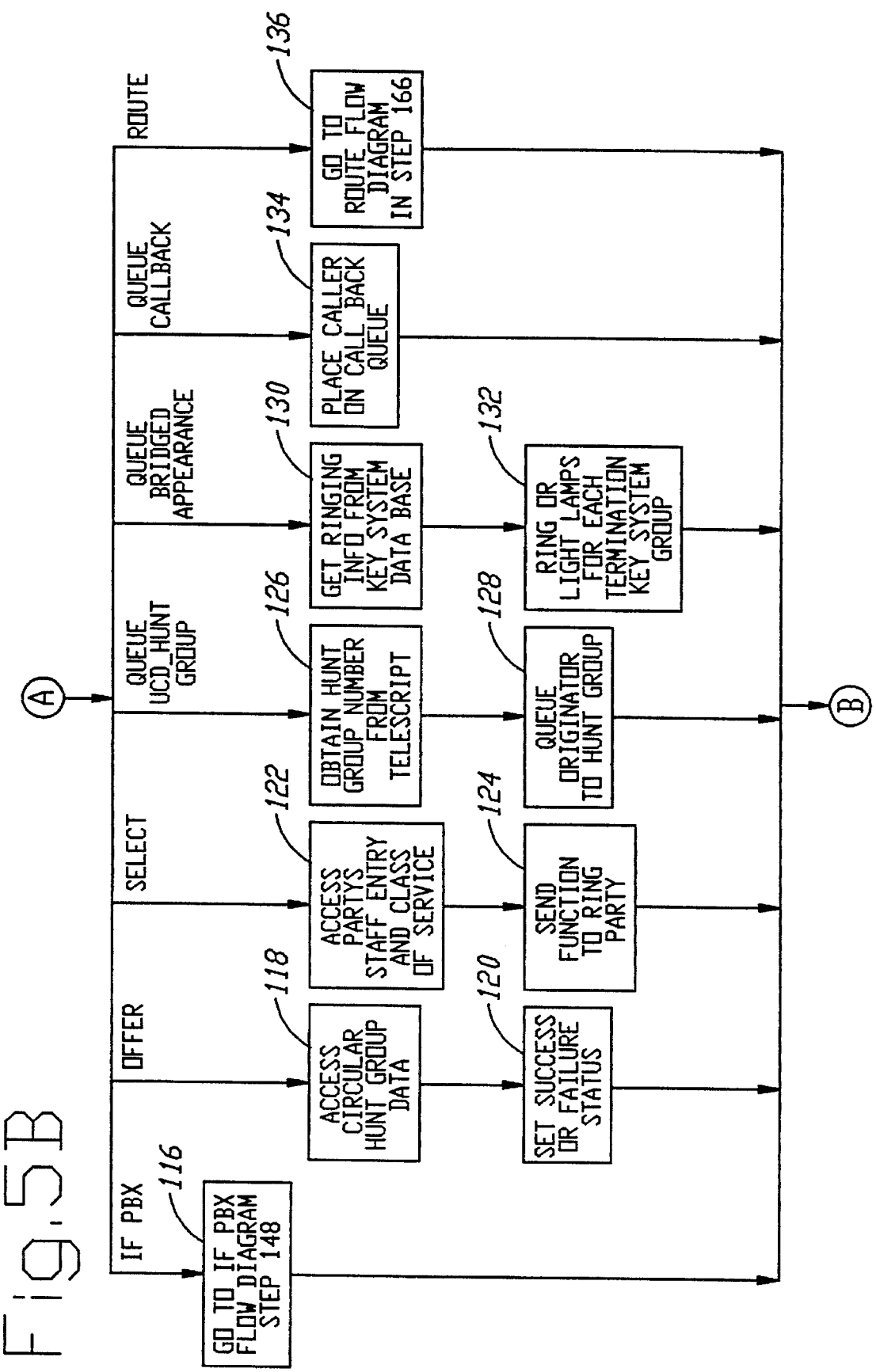

If the first read statement is the IF PBX statement then in step 116, FIG. 5B, the procedure moves to step 148 to process the IF PBX statement. If the first statement of the telescript is the OFFER statement then in step 118, the PBX 10 accesses the circular hunt group data in memory 16. The OFFER statement indicates that the call is being offered to a circular hunt group. In step 118, the OFFER statement accesses the circular hunt group database in the main memory 16 to determine if there is an idle PBX termination unit 22 in the group. In step 120, the telescript sets the success or failure status for the OFFER statement in order that subsequent statements can determine if the call is able to terminate to a PBX unit member of a hunt group.

If the first statement of the telescript is the SELECT statement, then in step 122, the PBX 10 accesses staff entry and class of service information for the called party stationed at a PBX unit 22. The SELECT statement indicates that the PBX termination unit 22 is a single telephonic line unit and the telescript controls the ringing of the telephonic line. The staff entry for the identified individual at the PBX termination unit 22 is obtained in step 122, as well as class of service table memory being read from the staff entry of the individual signed-in at the PBX telephonic unit. The class of service provides an indication as to the type of ringing applied to the terminating PBX position telephonic unit 22. In step 124, the terminating PBX position telephonic unit 22 functions to ring as specified in its associated class of service table in the main memory 16.

If the first statement read is the QUEUE UCD-HUNT GROUP statement, then in step 126, FIG. 5B, then the PBX 10 obtains the hunt group number from the telescript. The QUEUE UCD-HUNT GROUP statement indicates that the calling party is being terminated to a uniform call distribution group of PBX position telephonic units 22. In step 128, the central control processing unit 14 queues the call to identify the hunt group where the call waits in queue for an available PBX termination position telephonic unit 22.

If the first statement of the received telescript is the QUEUE BRIDGED APPEARANCE statement then the PBX 10 obtains ringing information from the key system database 34 in step 130, FIG. 5B. The QUEUE BRIDGED APPEARANCE statement indicates that the particular caller from an external telephonic unit 18 is terminating to a key set group of PBX position telephonic units 22. The key set configuration data is obtained from the key set database of the main memory 16. In step 132, the telescript processing commands the key set handler to ring the PBX position telephonic units 22 and illuminate call indication light emitting diode lamps on the unit console as specified in the key set database.

If the first received statement is the QUEUE CALL BACK statement, then in step 134, the caller from a calling telephonic unit 19, FIG. 4, is placed on QUEUE CALL BACK. The QUEUE CALL BACK statement indicates that the identified PBX position unit 22 is busy and ringing is not to be performed. The position PBX telephonic unit 22 has implemented a call back whereby the executing processes place the calling telephonic unit 19, FIG. 4, on a call back list to be subsequently called back when the PBX position telephonic unit 22 becomes idle.

Figure 5C:
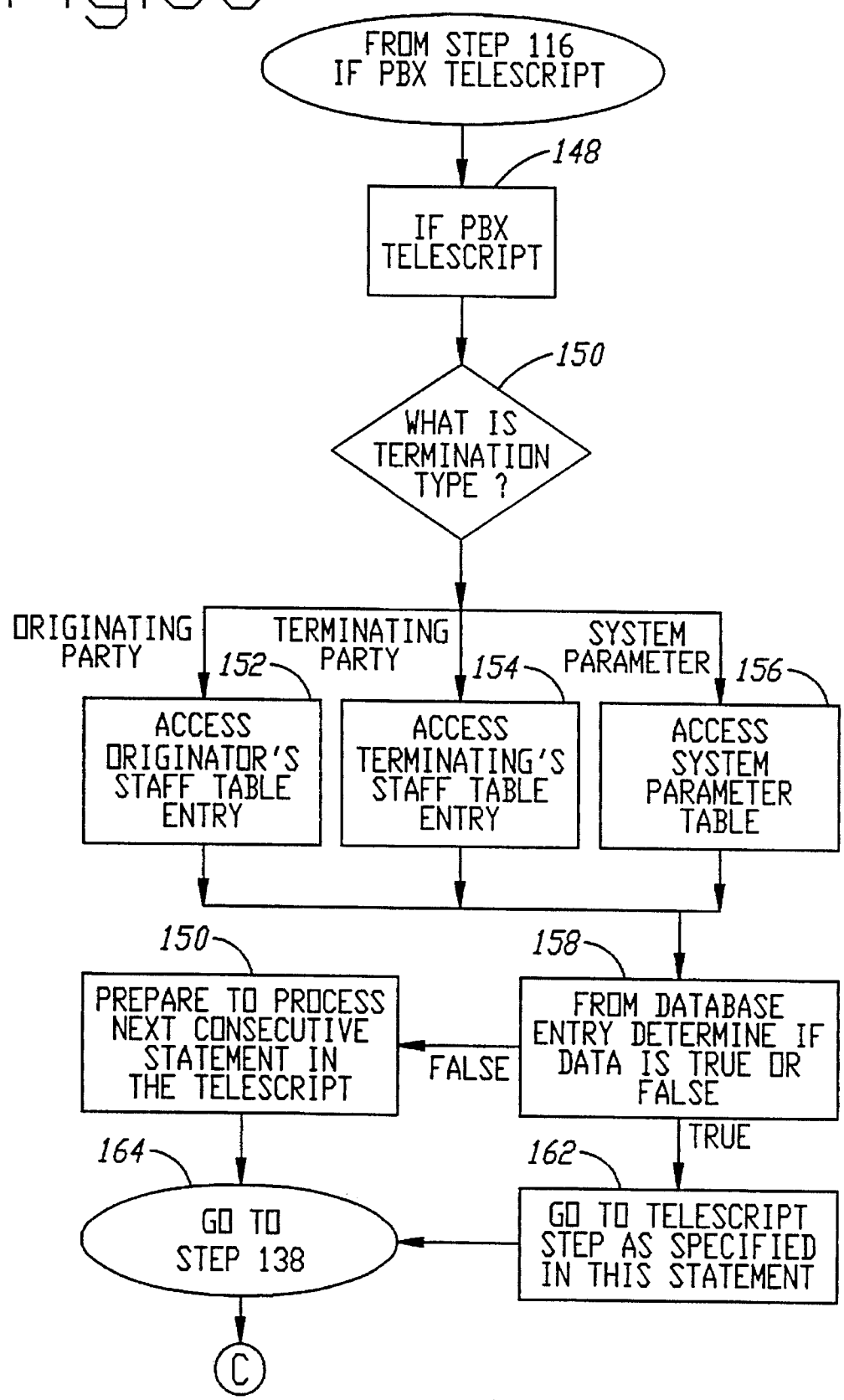
Figure 5D:
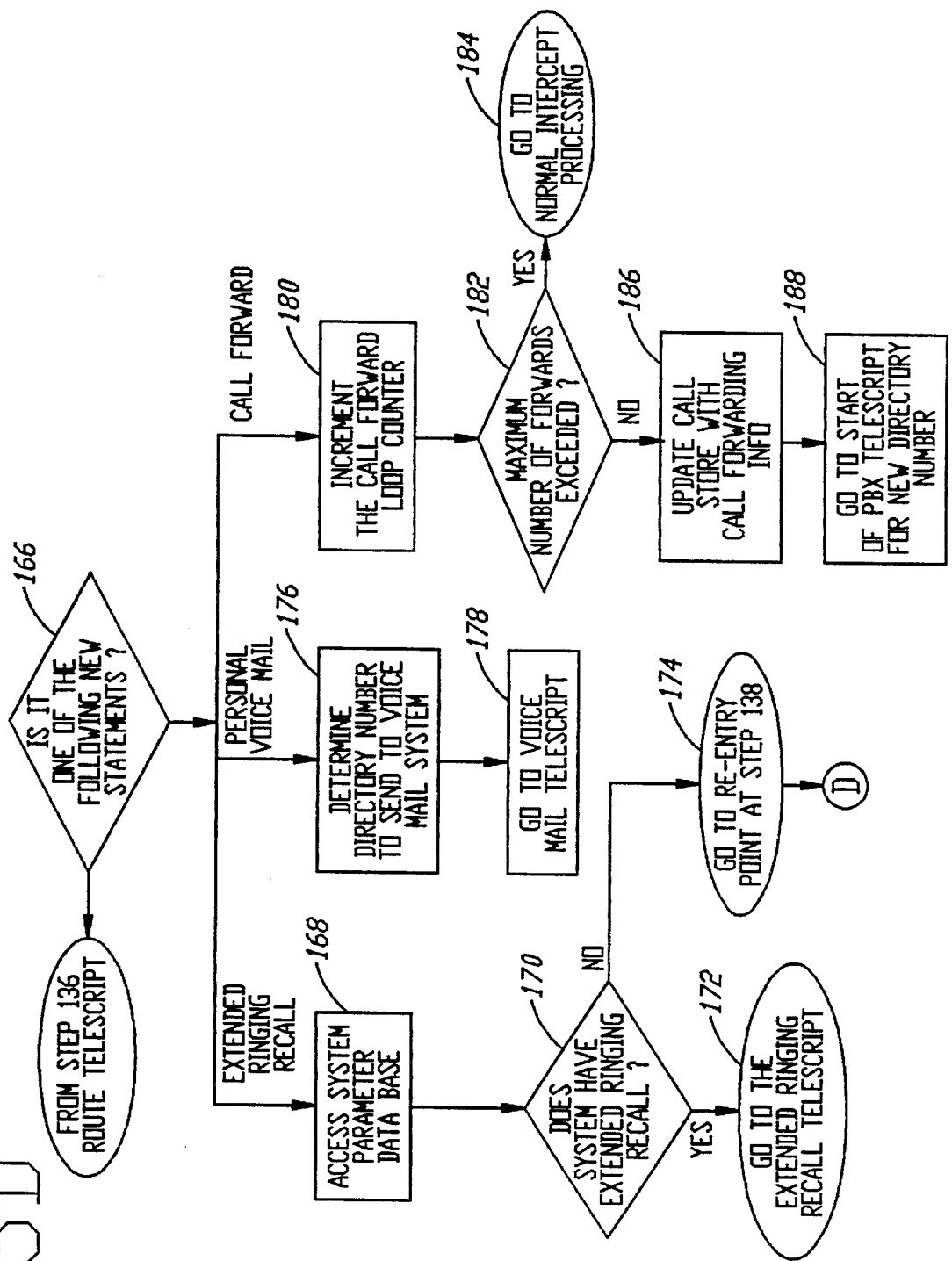

If the first statement received is the ROUTE statement then in step 136, FIG. 5B, the call is to be processed by a different telescript and the processing goes to step 166, FIG. 5D, for the operation of the ROUTE statement.

In step 138, FIG. 5A, the central control processing unit 14 determines if the call has been connected to a termination through telescript processing. If the calling party has connected to a terminating device (i.e. voice mail, alternate party, call forwarded) then the telescript is closed in step 140. In step 142, the call processing control goes to the existing PBX call connected processing in the main memory 16. If the read statement does not result in a connection to a terminating port the flow goes to the next statement in step 144, the next statement is read and the control returns to step 112, FIG. 5A.

In step 148, of FIG. 5C, a determination is made that the next statement of the received telescript is the IF PBX statement. In step 150, the telescript processes running on the central control processing unit 14 of the PBX 10 determines the termination type being tested in this step for the particular call. In step 152, if the termination type is the originating party then the staff table database entry in memory 16 for the originator is accessed. In step 154, if the termination type is the individual PBX terminating unit 22, then the staff table database entry in memory 16 for the PBX terminating unit is accessed. In step 156, if the termination type is a system parameter, then the system parameter table database entry in memory 16 is accessed by the associated telescript. In step 158, a determination is made based on the information previously received from the database entry as to the parameter being checked in the IF PBX statement is either true or false. If the test is false the telescript software running on the PBX 10 prepares to process the next consecutive statement in the telescript at step 160. If the test is true, then in step 162, the telescript software running on the PBX 10 prepares to process a next statement specified in the telescript. Once the next statement is prepared to be processed then the flow returns to step 138 of FIG. 5A.

If the statement received is the ROUTE statement then in step 166, FIG. 5D, a determination is made as to which route command is received. If the received statement is a route extended ringing recall statement then in step 168, the system parameter database in memory 16 is accessed. The route extended ringing recall statement, indicates that the PBX telephonic unit 22 being rung has been ringing for a time period and the period has expired. The system parameter table in memory 16 is accessed to determine if the database has the feature activated. In step 170, a determination is made if the PBX 10 has the extended ringing recall feature. If the PBX 10 has the extended ringing recall feature, then in step 172, the recall telescript is installed on the port for the call terminating at the PBX unit 22 and control is transferred to the recall telescript. If the PBX 10 does not have the extended ringing recall feature active, then in step 174, the PBX ignores the time out and returns to step 138, of FIG. 5A. If the statement received is the route personal voice mail statement, then in step 176, FIG. 5D, the PBX 10 determines the directory number to send to the voice mail system 40, FIG. 2. The route personal voice mail statement indicates that the caller is to be routed to the voice mail telescript for leaving a voice mail message for the terminating party at the associated PBX position telephonic unit 22.

The telescript processes running at the central control processing unit 14 determines the mail box number to send to the voice mail system 40, FIG. 2, either from the telescript, the dial digits or the default general mail box number. In step 178, FIG. 5D, the telescript software running at the central control processing unit 14 installs the personal voice mail telescript and transfers control to the personal voice mail telescript.

If the statement received is the route call forward statement, then in step 180, the call forward loop counter is implemented. The receipt of a route call forward statement indicates that the terminating party at a PBX position telephonic unit 22 has preprogram call forwarding for the calls it received. The call forward loop counter is implemented in step 180. In step 182, the PBX 10 determines if the maximum number of call forwards have been exceeded. If the number of excessive call forwards exceeded the value specified in the telescript, then the call is sent to intercept processing. If the number of excessive call forwards have not exceeded the specified limit then the call continues.

In step 184, the call is transferred to the existing call intercept processing. In step 186, the new call forward information is stored in the system database in memory 16 for the associated call. In step 188, the processing returns to the start of the PBX telescript for a new directory number. A new instance of the PBX telescript is installed on the port and processing begins again at the first statement of the PBX telescript for the new destination of the call being forwarded.

Referring to FIG. 6, the user interaction and control flow for the creation and installation of a PBX telescript at a system administration unit 24 coupled with the central control processing unit 14 of the PBX 10 begins at step 200 in which the system administrator at the system administration unit 24 opens a new telescript.

The system administrator enters an "open telescript" Command on a keyboard (not shown) of the system administration unit 24 to create a new PBX telescript. In step 202, the system administrator enters the modified or new telescript statements of the telescript into the system administration unit 24 using the "enter telescript command". The system administrator is enabled to change the order and the particular type of telescript statements or ordered steps in creating a new telescript while the PBX system is on-line, thereby selectively defining new call handling operation features for a particular PBX position telephonic unit 22. In step 204, FIG. 6, the PBX system 10 central control processing unit 14 determines and verifies if the statements entered conform with the syntax specified for the telescript action requested. If an error is detected then the procedural flow operating at the system administration unit 24 returns the system administrator to step 202 to enter a new telescript statement which meets the appropriate syntax.

If all the telescript action statements are entered which meet the correct syntax, then in step 206, the system administrator closes the telescript using the close telescript command. In step 208, the system administrator requests verification of the new telescript with the modified sequence of actions derived from the various statements of the telescript by entering a "verify telescript" command at the system administration unit 24. In step 210, the central control processing unit 14 coupled with the system administration unit 24 verifies that all the previously entered action statements operate together in accordance with the telescript parameters of the PBX 10. If the verification fails, then the system administrator or user is notified through the system administration unit 24 and the operation returns to step 202.

If the PBX 10 verifies the newly entered action statements resulting in a modified telescript, then in step 212, FIG. 6, the central control processing unit 14 creates the state machine for the new telescript from the partial state machines previously developed and coded for each action statement. This central control processing unit 14 creates an executable state machine though the processes derived of the various telescript action statements. In step 214, the system administrator enters the "activate telescript" command to install the state machine for use by the PBX 10. The central control processing unit 14 enters into the PBX system memory 16 data tables the location of the new PBX telescript. All newly received calls terminating to a PBX position telephonic unit 22 employ the new PBX telescript having the associated call handling features previously implemented on the system 10 in steps 200–214.

While a detailed description of the preferred embodiment of the invention has been given, it should be appreciated that many variations can be made thereto without departing from the scope of the invention as set forth in the appended claims.

I claim:

1. In a telecommunication system having a private branch exchange (PBX) with a multiport switch controlled by a central control processing unit and a PBX main memory for directing telephonic calls to terminate at identified ones of a plurality of PBX internal telephonic units placed at predetermined positions and connected with the multiport switch, the improvement comprising:

means for storing a call handling feature script defining call handling operations for telephonic calls directed to an identified PBX internal telephonic unit and in which the call handling feature script includes an ordered set of call handling statements with each of the statements defining a particular call servicing operation; and means for modifying the call handling feature script in response to the entry of user commands via a data entry terminal coupled with the central control processing unit of the PBX to alter the call handling operations of telephonic calls terminating at the identified PBX internal telephonic unit while the PBX is actively on-line and without requiring the reprogramming and recompiling of programmed code.

2. The telecommunication system of claim 1 in which the modifying means is capable of at least one of adding particular call handling statements to the ordered set of the call handling feature script and deleting particular call handling statements from the ordered set of the call handling feature script.

3. The telecommunication system of claim 1 in which the modifying means includes means for changing the order of the call handling statements of the call handling feature script.

4. The telecommunication system of claim 3 including means for verifying that the changed order of the call handling statements comply with the internal system parameters of the PBX.

5. The telecommunication system of claim 4 including means for creating a state machine derived from the changed ordered set of call handling statements in response to said verifying means.

6. The telecommunication system of claim 1 including a primary PBX telescript having a predefined set of call handling statements associated with each of the plurality of PBX internal telephonic units and in which the primary PBX telescript is implemented as a state machine having a logical instance on the ports of the multiport switch for controlling the call handling operations at the PBX internal telephonic units.

7. The telecommunication system of claim 6 in which said primary telescript determines whether the identified PBX internal telephonic unit is at least one of (a) a busy unit, (b) a member of a preselected key system group, (c) a member of a preselected hunt group, (d) a unit directing telephonic calls to voice mail, (e) a unit call forwarding telephonic calls, (f) a unit which intercepts telephonic calls which cannot be processed and has said calls redirected to an alternative destination, (g) a unit having a host computer coupled with the PBX for determining call disposition, and (h) an idle unit.

8. The telecommunication system of claim 7 in which the primary telescript determines a plurality of (a)–(h).

9. The telecommunication system of claim 1 in which the modifying means is capable of performing modifications to the call handling feature script while the PBX is on-line to actively direct telephonic calls to terminate at the identified ones of the PBX internal telephonic units.

10. The telecommunication system of claim 9 in which said data entry terminal is a system administration unit electrically coupled with the central control processing unit for entering said commands to initiate the alteration of said call handling operations for the PBX internal telephonic unit at the PBX while the PBX is on-line to continue the PBX to actively direct telephonic calls to terminate at the identified ones of the PBX internal telephonic units.

11. The telecommunication system of claim 1 including means for selectively controlling the call handling operations to perform at least one of (a) directing telephonic calls incoming to the PBX telephonic unit to a voice mail group, (b) directing telephonic calls incoming to the PBX telephonic unit to an intercept group, (c) directing telephonic calls incoming to the PBX telephonic unit to a PBX hunt group, (d) directing telephonic calls incoming to the PBX telephonic unit to alternate PBX internal telephonic units, (e) directing the PBX telephonic unit to automatically call back a plurality of callers, (f) providing visual and audible indications at PBX internal telephonic units of a group in response to receipt of telephonic calls at the PBX internal telephonic units, and (g) notifying a host computer coupled with the PBX of calls directed to the PBX internal telephonic unit.

12. The telecommunication system of claim 11 including means for selectively controlling a plurality of the call handling operations of (a)–(g).

13. The telecommunication system of claim 12 including means for determining if one of the plurality of call handling operations is available at the PBX internal telephonic unit.

14. In a telecommunication system having a private branch exchange (PBX) with a multiport switch controlled by a central control processing unit and a PBX main memory for directing telephonic calls to terminate at identified ones of a plurality of PBX internal telephonic units placed at predetermined positions and connected with the multiport switch, the improvement being a method of modifying PBX terminating call features, comprising the steps of:

storing a call handling feature script defining call handling operations for telephonic calls terminating at an identified PBX internal telephonic unit and in which the call handling feature script includes an ordered set of call handling statements with each of the statements defining a particular call servicing operation; and modifying the call handling feature script in response to the entry of user commands at via a system administration unit coupled with the central control processing unit to alter the call handling operations of telephonic calls terminating at the identified PBX internal telephonic unit and in which such user commands are entered while the PBX is actively on-line to continually direct telephonic calls to terminate at the identified ones of the PBX internal telephonic units without requiring the reprogramming and recompiling of programmed code.

15. The method of claim 14 including the step of changing the order of the call handling statements of the call handling feature script.

16. The method of claim 15 including the step of verifying that the changed order of the call handling statements comply with the internal system parameters of the PBX.

17. The method of claim 16 including the step of creating a state machine derived form the changed ordered set of call handling statements in response to the verification of the changed ordered set of call handling statements comply with the internal system parameters of the PBX.

18. The method of claim 14 including the step of selectively controlling the call handling operations to perform at least one of (a) directing the telephonic calls incoming to the PBX telephonic unit to a voice mail group, (b) directing telephonic calls incoming to the PBX telephonic unit to an intercept group, (c) directing telephonic calls incoming to the PBX telephonic unit to a PBX hunt group, (d) directing telephonic calls incoming to the PBX telephonic unit to alternate PBX internal telephonic units, (e) directing the PBX telephonic unit to automatically call back a plurality of callers, (f) providing visual and audible indications at PBX internal telephonic units of a group in response to receipt of telephonic calls at the PBX internal telephonic units, and (g) notifying a host computer coupled with the PBX of calls directed to the PBX internal telephonic unit.

* * * * *